July 8, 1930.  D. R. WILSON  1,770,095
CHECK ROWER
Filed July 18, 1927  3 Sheets-Sheet 1

D. R. Wilson
INVENTOR
BY Victor J. Evans
ATTORNEY

July 8, 1930.  D. R. WILSON  1,770,095
CHECK ROWER
Filed July 18, 1927  3 Sheets-Sheet 2
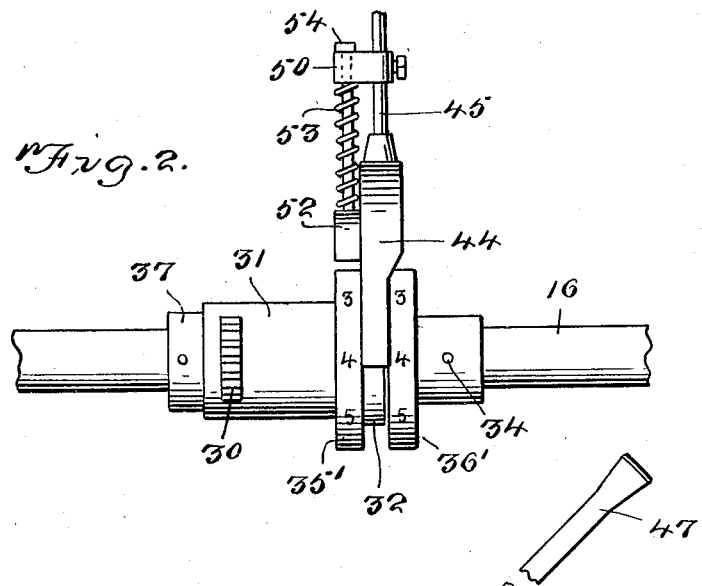
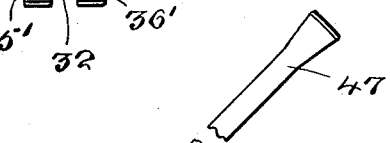
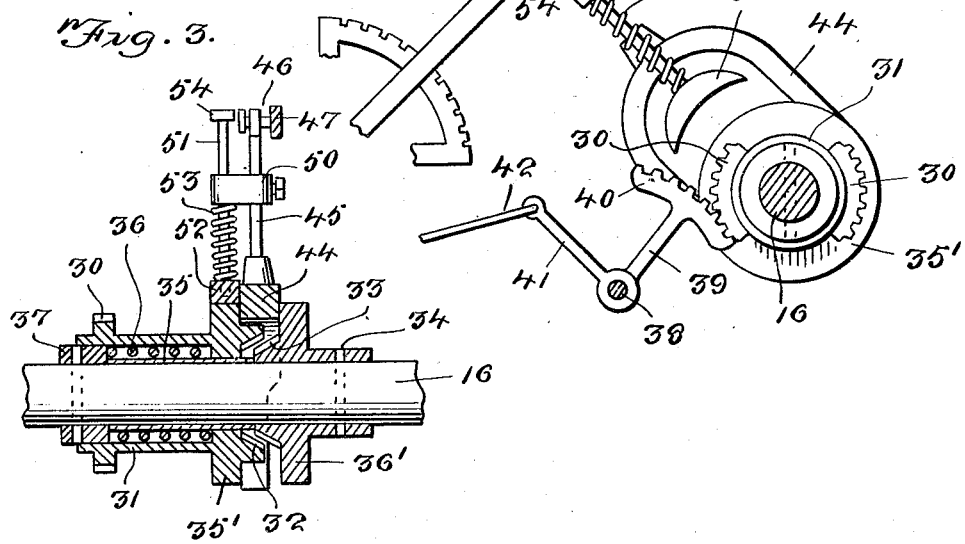

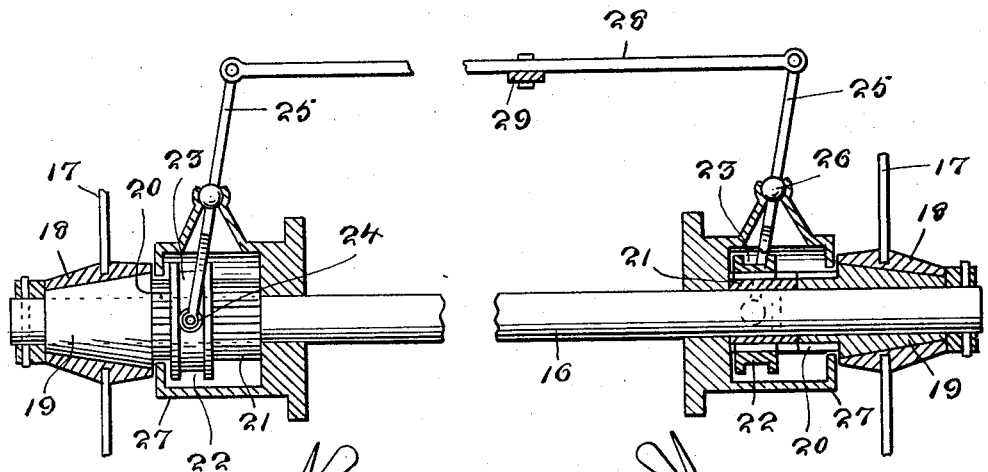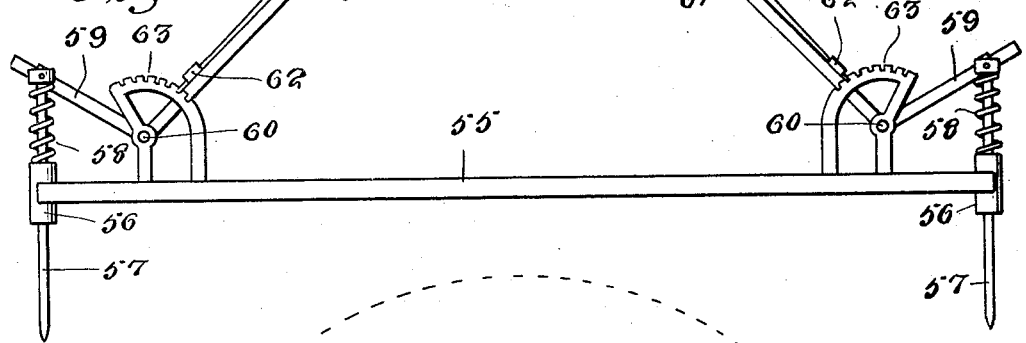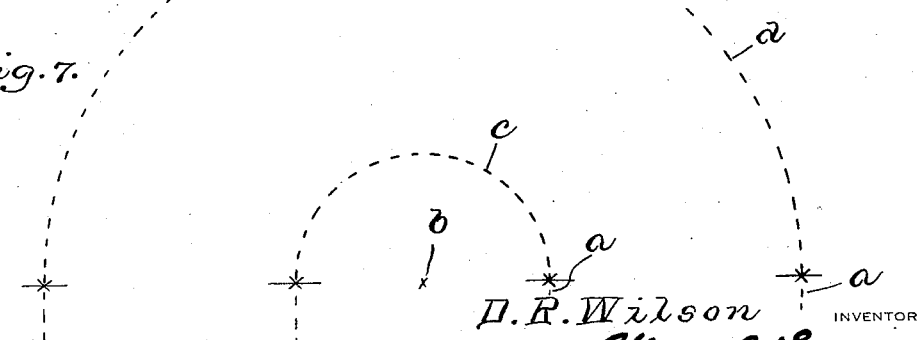

Patented July 8, 1930

1,770,095

UNITED STATES PATENT OFFICE

DELMAR R. WILSON, OF MORAVIA, IOWA

CHECK ROWER

Application filed July 18, 1927. Serial No. 206,587.

This invention relates to improvements in check row planters and has particular relation to means for controlling the operation of the seed dropping mechanism of the planter, an object being to provide means for automatically dropping the seed grain at proper intervals without the use of a check row wire or cord.

Another object of the invention is the provision of means as above stated which may be easily and accurately adjusted, and which will maintain proper adjustment, the character of the mechanism being such as to permit of the machine being turned at the end of the rows so as to maintain proper spacing of the seed in succeeding rows.

With the above and other objects in view, the invention further includes the following novel features and details of construction, to be hereinafter more fully described, illustrated in the accompanying drawings and pointed out in the appended claims.

In the drawings:—

Figure 2 is an enlarged fragmentary elevation of the clutch for controlling the dropping mechanism.

Figure 3 is a vertical sectional view of the same.

Figure 4 is an enlarged fragmentary section on the line 4—4 of Figure 1.

Figure 5 is an enlarged section partly broken away illustrating the means for locking the driving wheels to the axle.

Figure 6 is a detail elevation of the gage frame, the stakes and controlling means therefor.

Figure 7 is a diagram illustrating the path of the wheels of the machine when the latter is turned at the end of the rows.

Figure 1:
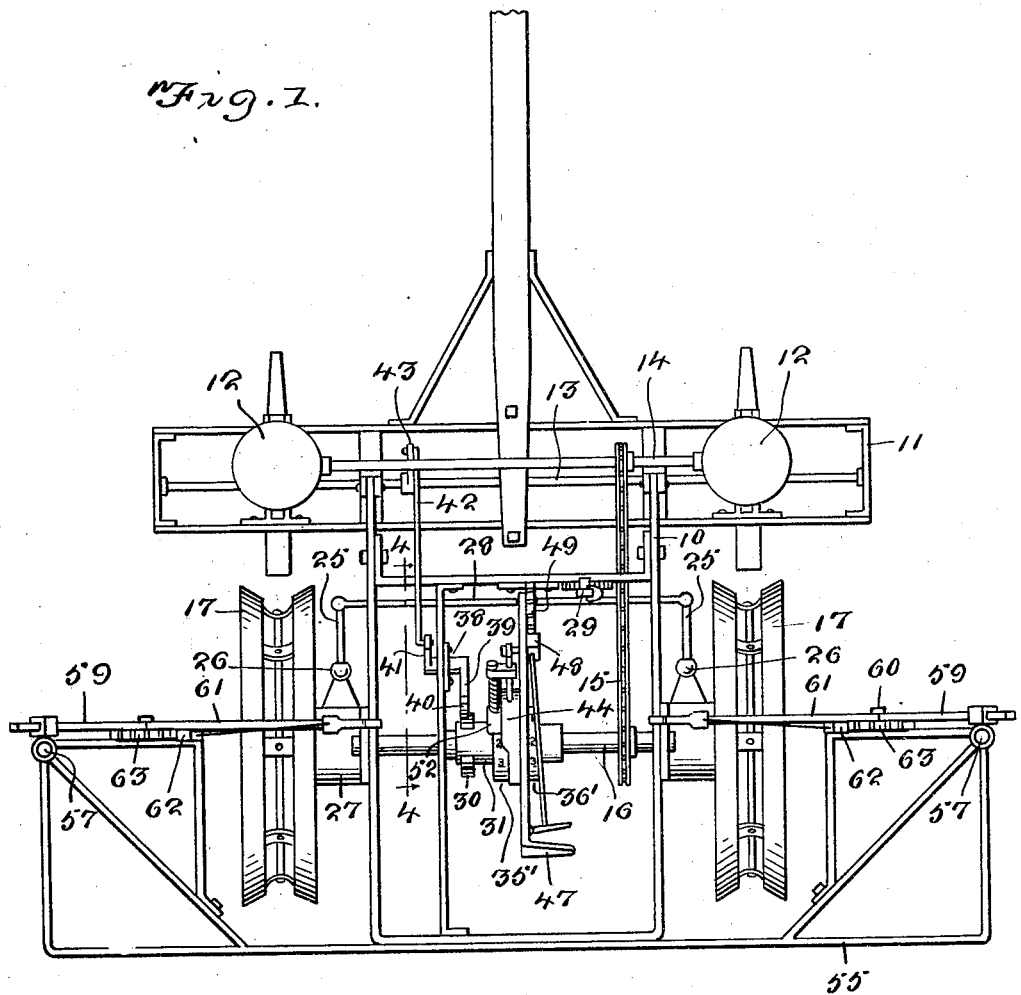
Figure 1 is a plan view of a check row planter embodying the invention.

Referring to the drawings in detail wherein like characters of reference denote corresponding parts, the machine as shown comprises a suitable frame 10 which connects the machine proper with the frame 11 carrying the seed hoppers 12. These hoppers are of the usual or any preferred type and carry suitable dropping mechanism controlled by a rock shaft 13. The hoppers may also be provided with suitable agitators operated from a shaft 14 which is driven by a chain and sprocket drive 15 from the axle 16 of the machine.

Mounted upon the axle 16 are driving wheels 17, the latter including hubs 18 which are engaged by spindles 19, the latter being freely rotatable upon the axle 16. The spindles 19 are provided with toothed extensions 20 which abut toothed sleeves 21. These sleeves are keyed or otherwise secured upon the axle 16. Slidable upon the sleeves 21 and the toothed extensions 20 are internally toothed collars 22, the outer peripheries of these collars being provided with annular grooves 23 which receive lugs 24 provided at the inner ends of shifting levers 25. The levers 25 are mounted for pivotal movement as shown at 26, the pivotal supports for these levers extending from housings 27 which enclose the parts just referred to. This is plainly illustrated in Figure 5 of the drawings. The levers 25 are connected by means of a rod 28 and the latter has connected thereto a foot pedal 29, so that the operator of the machine may press upon this pedal to move the rod 28 longitudinally and shift the levers 25. By reference to Figure 5 of the drawings it will be seen that when the collars 22 are in the position shown, the spindles 19 and consequently the wheels 17 are free of the axle 16, but when the collars are shifted to the right of said figure so as to engage both the teeth of the sleeves 21 and the extensions 20, the spindles will be locked to the axle and the axle will rotate with the wheels.

For the purpose of operating the shaft 13 of the dropping mechanism, the axle 16 carries a pair of oppositely disposed segmental gears 30. These gears are carried by a sleeve 31 which is slidable longitudinally of the axle and which carries a clutch member 32 arranged to engage a clutch member 33. The sleeve 31 rotates freely upon the axle when the clutch members are disengaged, while the clutch member 33 is pinned or otherwise secured to the axle as shown at 34. A sleeve 35 surrounds the axle 16 within the sleeve 31 and a spring 36 is interposed between the sleeves. One end of this spring bears against the clutch member 32 so as to force the same into engagement with the clutch member 33 and the opposite end of the spring bears against a collar 37 which is secured to the axle 16.

Pivotally mounted as shown at 38 is an arm 39 whose outer end carries a segmental gear 40. This gear is arranged in the path of the segmental gears 30 when the clutch members 32 and 33 are engaged, so that when the sleeve 31 is locked upon the axle, the segmental gears 30 will alternately engage the segmental gear 40 to rock the arm 39. Rigid with the arm 39 is an arm 41 and connected to this last mentioned arm is one end of a rod 42 whose opposite end is connected to an arm 43 which is rigid with the shaft 13. Thus, when the axle 16 is rotated, the shaft 13 will be intermittently rocked to actuate the dropping mechanism within the seed hoppers 12.

In order to separate the clutch members 32 and 33 there is provided a cam 44 which straddles the clutch and is guided between annular flanges 35' and 36' carried respectively by the clutch members 32 and 33. Extending from this cam is an arm 45 which is pivotally secured as at 46 to a pivotally mounted hand lever 47. This hand lever may be pivotally moved to raise or lower the cam 44 to permit the clutch members 32 and 33 to engage or disengage these members. The lever 39 is held in adjusted position by means of a spring actuated dog 48 which is adapted to engage a toothed segment 49.

Secured to the arm 45 is an arm 50 through which operates a rod 51. This rod carries a brake shoe 52 and has mounted thereon a spring 53 which bears against the arm 50 and against the shoe 52. The rod 51 is slidable through the arm 50 and carries at its outer end a head 54 so as to provide a stop.

It will be apparent from the foregoing description and accompanying drawings that with the axle 16 locked to the wheels 17, the axle will be rotated and with the clutch members 32 and 33 engaged, the segmental gears 30 will alternately engage the segmental gear 40 and the shaft 13 will be intermittently rocked to operate the seed dropping mechanism. By means of the lever 47, the clutch members 32 and 33 may be separated, continued inward movement of the separating cam 44 moving the brake shoe 52 into engagement with the periphery of the annular flange 35 so as to hold the sleeve 31 and consequently the segmental gears 30 against rotation.

Secured to the frame 10 is a gage frame 55 and slidingly mounted in guides 56 at opposite ends of this frame are pins or stakes 57. These pins or stakes are normally held elevated by means of springs 58 and have secured to their upper ends an arm 59 which is pivotally mounted as shown at 60. Rigid with the arms 59 are operating levers 61 which carry spring dogs 62 arranged to engage toothed segments 63, so that by operating the levers 61, the stakes 57 may be moved into and out of engagement with the ground.

When the machine reaches the ends of the rows indicated by the dotted lines $a$ in Figure 7 of the drawings, one of the stakes 57 (the left hand stake) is forced into the ground at the point indicated at $b$. The left hand wheel 17 is disengaged from the axle 16 and the right hand wheel engaged. In turning, the left hand wheel will follow the dotted line indicated at $c$ and the right hand wheel the line indicated at $d$. The circumference of the wheels 17 is such that in making the turn the outside or right hand wheel will make two and one-half revolutions. This is assuming that the rows are forty and one-third inches apart and the wheels seventy-six inches in circumference. With the wheels seventy-six inches in circumference the dropping mechanism will operate at each half revolution of the wheel or thirty-eight inches apart so that the space between hills and rows will be thirty-eight by forty and one-third inches. When the turn is completed and the next rows started the segmental gears 30 should be properly positioned to begin the next succeeding rows. However, adjustment may be accurately made by means of the cam 44. This adjustment is determined by providing the annular flanges 35' and 36' with like numbers as shown in Figure 2 and when these numbers correspond, proper adjustment is made.

The invention is susceptible of various changes in its form, proportions and minor details of construction and the right is herein reserved to make such changes as properly fall within the scope of the appended claims.

Having described the invention what is claimed is:—

1. In a check row planter, the combination with the driving wheels and axle, of means intermittently operated by the axle to control the operation of the seed dropping mechanism of the machine, means carried by the machine and adapted to be operated at the end of the row when the machine is turned to provide a turning center, means to render the axle operated means active or inactive and selective means to lock both or either of the driving wheels to the axle.

2. In a check row planter, the combination with the driving wheels and axle, of intermittently operated means to actuate the dropping mechanism of the machine, a clutch to lock the intermittently operated means to the axle and a manually controlled cam to control the clutch and selectively position the dropping mechanism actuating means, means carried by the machine and adapted to be operated at the end of the row when the machine is turned to provide a turning center and means to lock both or either of the driving wheels to the axle.

3. In a check row planter, a shaft for operating the seed dropping mechanism, a driving axle, a pivotally mounted arm operatively connected with the shaft to actuate the latter, means normally locked upon the axle to engage and intermittently move the arm, means to release the arm engaging means from the axle and move said means to one side of said arm and means operated by the arm releasing means to hold the arm engaging means stationary when the latter is released.

4. In a check row planter, a shaft for operating the seed dropping mechanism, a driving axle, a pivotally mounted arm operatively connected with the shaft to actuate the latter, a sleeve slidable and freely rotatable upon the axle, a clutch to lock the sleeve to the axle, means carried by the sleeve to engage and intermittently move the arm, means to disengage the clutch and means operated by the clutch disengaging means to prevent rotation of the sleeve.

5. In a check row planter, an axle, driving wheels freely rotatable thereon, means operated by the axle to operate the seed dropping mechanism of the planter, means carried at either side of the machine and adapted to be operated at the end of the row to provide a turning center for said machine, means to selectively lock both or either of the driving wheels to the axle in accordance with the direction of the turn, and means to adjust the seed dropping mechanism operating means to insure proper operation of said seed dropping mechanism at the completion of a turn.

In testimony whereof I affix my signature.

DELMAR R. WILSON.